(12) United States Patent
Notani et al.

(10) Patent No.: US 8,214,250 B2
(45) Date of Patent: *Jul. 3, 2012

(54) SYSTEM AND METHOD FOR MULTI-ENTERPRISE SUPPLY CHAIN OPTIMIZATION

(75) Inventors: Ranjit N. Notani, Southlake, TX (US); Shrikant Ranade, Irving, TX (US); Nitin Goyal, Plano, TX (US); Anand Iyer, Flower Mound, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 1189 days.

This patent is subject to a terminal disclaimer.

(21) Appl. No.: 11/634,056

(22) Filed: Dec. 5, 2006

(65) Prior Publication Data
US 2007/0136126 A1 Jun. 14, 2007

Related U.S. Application Data

(63) Continuation-in-part of application No. 09/398,170, filed on Sep. 17, 1999, now Pat. No. 7,260,550.

(60) Provisional application No. 60/100,981, filed on Sep. 18, 1998.

(51) Int. Cl.
*G06Q 40/00* (2006.01)

(52) U.S. Cl. .............................. 705/8; 705/30

(58) Field of Classification Search ................. 705/4–44
See application file for complete search history.

(56) References Cited

U.S. PATENT DOCUMENTS

| | | | |
|---|---|---|---|
| 4,827,423 A | 5/1989 | Beasley et al. | |
| 5,040,123 A | 8/1991 | Barber et al. | |
| 5,615,109 A | 3/1997 | Eder | |
| 5,754,938 A | 5/1998 | Herz et al. | |
| 5,758,097 A | 5/1998 | Debe et al. | |
| 5,897,620 A | 4/1999 | Walker et al. | |
| 5,953,707 A | 9/1999 | Huang et al. | |
| 5,970,479 A | 10/1999 | Shepherd | |
| 5,974,395 A | 10/1999 | Bellini et al. | |
| 5,991,732 A | 11/1999 | Moslares | |
| 6,134,536 A | 10/2000 | Shepherd | |

(Continued)

FOREIGN PATENT DOCUMENTS

EP 0 0770 967 A 10/1996

(Continued)

OTHER PUBLICATIONS

George A. Aljian, Purchasing Handbook, 2nd ed., McGraw-Hill Book Co., 1966, pp. 14-28 to 14-36, 3-30 to 3-32, and 19-52 19-54.

(Continued)

*Primary Examiner* — Frantzy Poinvil
(74) *Attorney, Agent, or Firm* — Booth Udall, PLC; Steven J. Laureanti

(57) ABSTRACT

A method of optimizing multi-enterprise supply chain agreements using an electronic scenario based option contract includes creating at a buyer computer a plurality of scenarios of forecasted demand for one or more products and communicating from the buyer computer to a seller computer an offer to enter into an option contract for the supply of the one or more products, the option contract including an option corresponding to each of the plurality of scenarios of forecasted demand. The method further includes executing the option contract, receiving at the buyer computer an indication of current buyer demand for at least one scenario associated with the one or more products, and exercising at least a portion of the option in the option contract based at least in part on the indicated buyer demand.

40 Claims, 9 Drawing Sheets

U.S. PATENT DOCUMENTS

| | | | |
|---|---|---|---|
| 6,151,582 | A | 11/2000 | Huang et al. |
| 6,157,915 | A | 12/2000 | Bhaskaran et al. |
| 6,249,774 | B1 | 6/2001 | Roden et al. |
| 6,263,321 | B1 | 7/2001 | Daughtery, III |
| 6,738,975 | B1 | 5/2004 | Yee et al. |
| 6,877,153 | B2 | 4/2005 | Konnersman |
| 7,039,562 | B1 | 5/2006 | Notani et al. |
| 7,039,597 | B1 | 5/2006 | Notani et al. |
| 2002/0019761 | A1 | 2/2002 | Lidow |
| 2007/0136126 | A1 | 6/2007 | Notani et al. |

FOREIGN PATENT DOCUMENTS

| | | |
|---|---|---|
| EP | 0 770 967 A2 | 5/1997 |
| EP | 0770967 | 5/1997 |
| GB | 2 293 902 A | 4/1996 |
| GB | 2 302 427 A | 1/1997 |
| GB | 2316506 | 2/1998 |
| WO | WO 98/08177 | 2/1998 |
| WO | WO 98/34167 | 8/1998 |
| WO | WO 0017798 | 3/2000 |
| WO | WO 02063424 | 8/2002 |

OTHER PUBLICATIONS

Carl R. Schullz, "Modeling take-o9r-pay contract decisions", Decision Sciences, Atlanta: vol. 28, Issue 1, p. 213, Winter 1997.

"Concentra and i2 Technologies to integrate sales configuration with global supply chain management", Business Wire, p. 10101141, Oct. 10, 1995, Dialog file 148, Accession No. 08283166.

Anderson, Karl, "Terms of Sales", Journal of Marketing (pre-1986; Jan. 1947; 11;, 000003 ABI/INFORM Global, p. 250.

Raina, Hari K., "Tehniques for Monitoring and Administering Import Contracts", International Trade Forum; Apr.-Jun. 1991; 2; ABI/INFORM Global, p. 20.

John Downes and Jordan Elliot Goodman, Dictionary of Finance and Investment terms, 4th Edition, Barron's Publisher, 1995 (pp. 173, 390-393).

Farnsworth E. A. et al., "Cases and Metrials on Contracts," 4th ed., Westbury, N.Y., 1988, pp. 181, 188 and 216.

Peter H. Ritchken et al., "Contingent Claims Contracting for Purchasing Decisions in Inventory Management," Operations Research, v34, n.6, p. 864-870, Nov. 1996.

U.S. Appl. No. 09/398,170, "System and Method for Multi-Enterprise Supply Chain Optimization," filed by Ranjit N. Notani.

Anonymous: "A Supply Chain Management Algorithm with Vendor Informaiton via Internet", Research Disclosure, v.41 , No. 416, p. 1, Dec. 1998.

John Downes and Jordan Eliot Goodman, Dictionary of Finance and Investment terms, 4th Edition, Barron's Publisher, 1995 (pp. 173, 390-393).

George W. Alhan, Purchasing Handbook, McGraw hill book Company, 2nd. ed., 1966, pp. 3-30 to 3-32, 5-41 to 5-42, 13-21 to 13-33, 14-28 to 14-35, and 19-52 to 19-54.

George W. Aljian, Purchasing Handbook, McGraw-Hill Co., Second edition, 1966, pp. 13-5-13-33.

Farnsworth E. A. et al, "Cases and Metrials on Contracts," 4th ed., Westbury, N.Y., 1988, pp. 181, 188 and 218.

Peter H. Ritchken et al, "Contingent Claims Contracting for Purchasing Decisions in Inventory Management," Operations Research, v34, n.6, p. 864-870, Nov. 1996.

Federal REgister, vol. 62, No. 21, Jan. 13, 1997, p. 4821, col. 3, lines 17-57.

wysisyg://31/http:quotes.masdaq.com/op...s/option_flex_index_options_contract, Jun. 16, 2000.

U.S. Appl. No. 09/398,170, "System and Method for Multi-Enterprise Supply Cham Optimization," filed by Ranjit N. Notani.

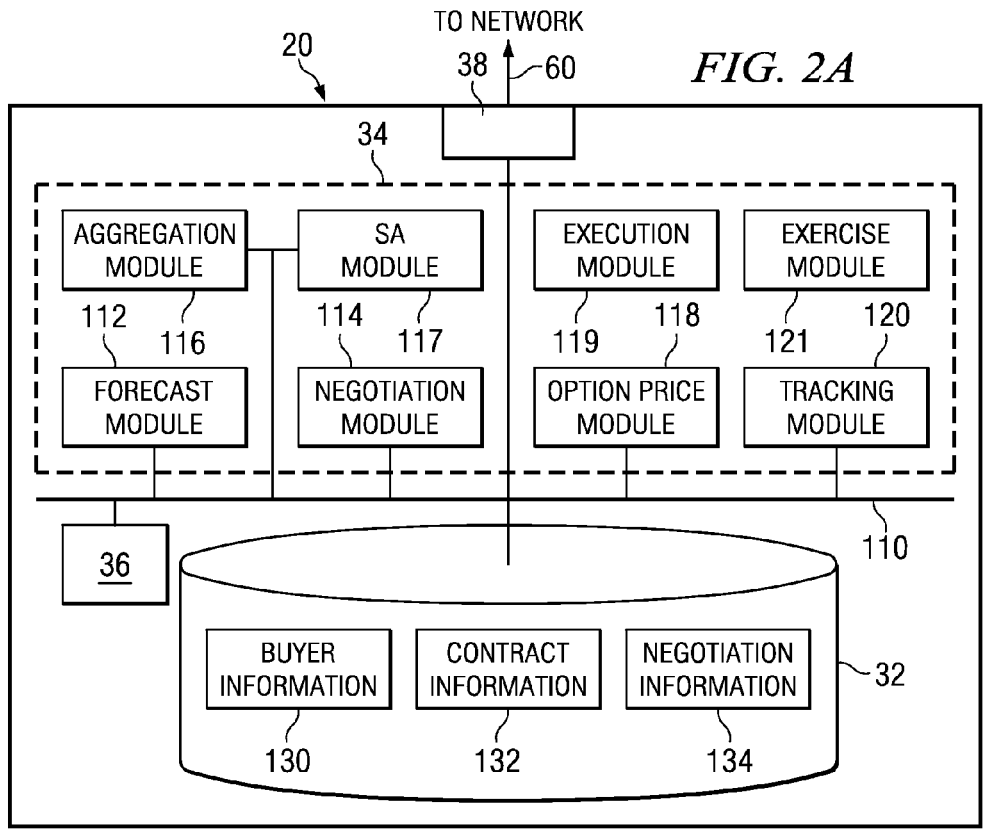
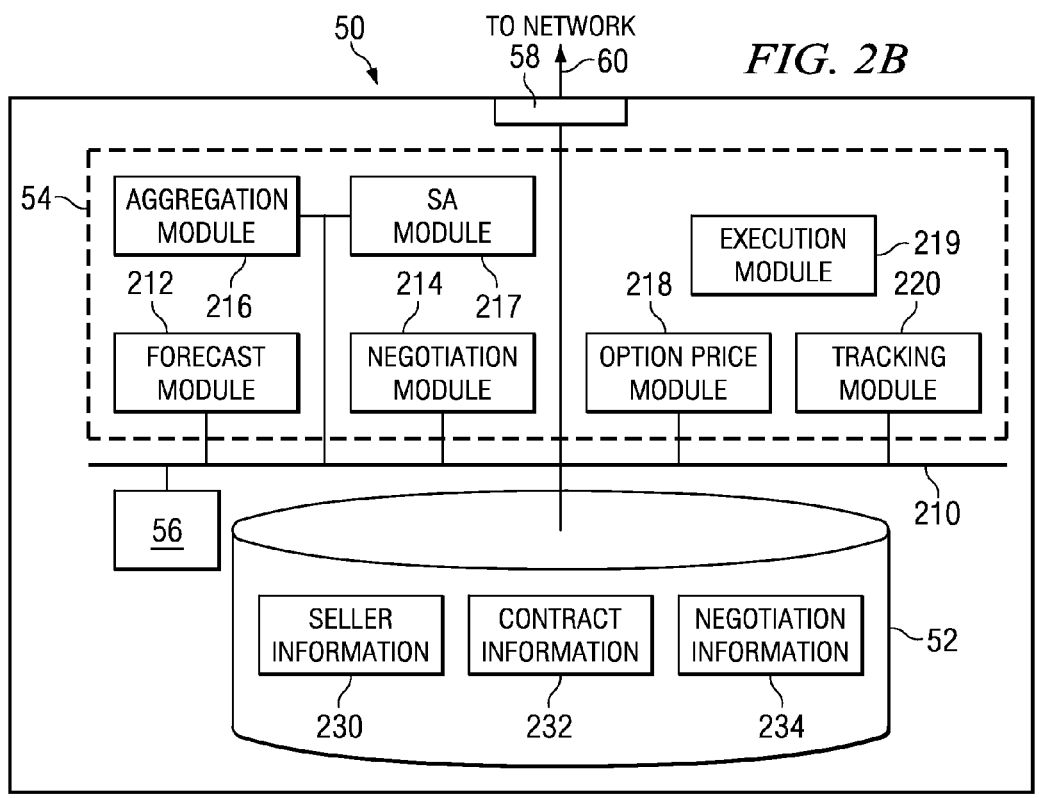

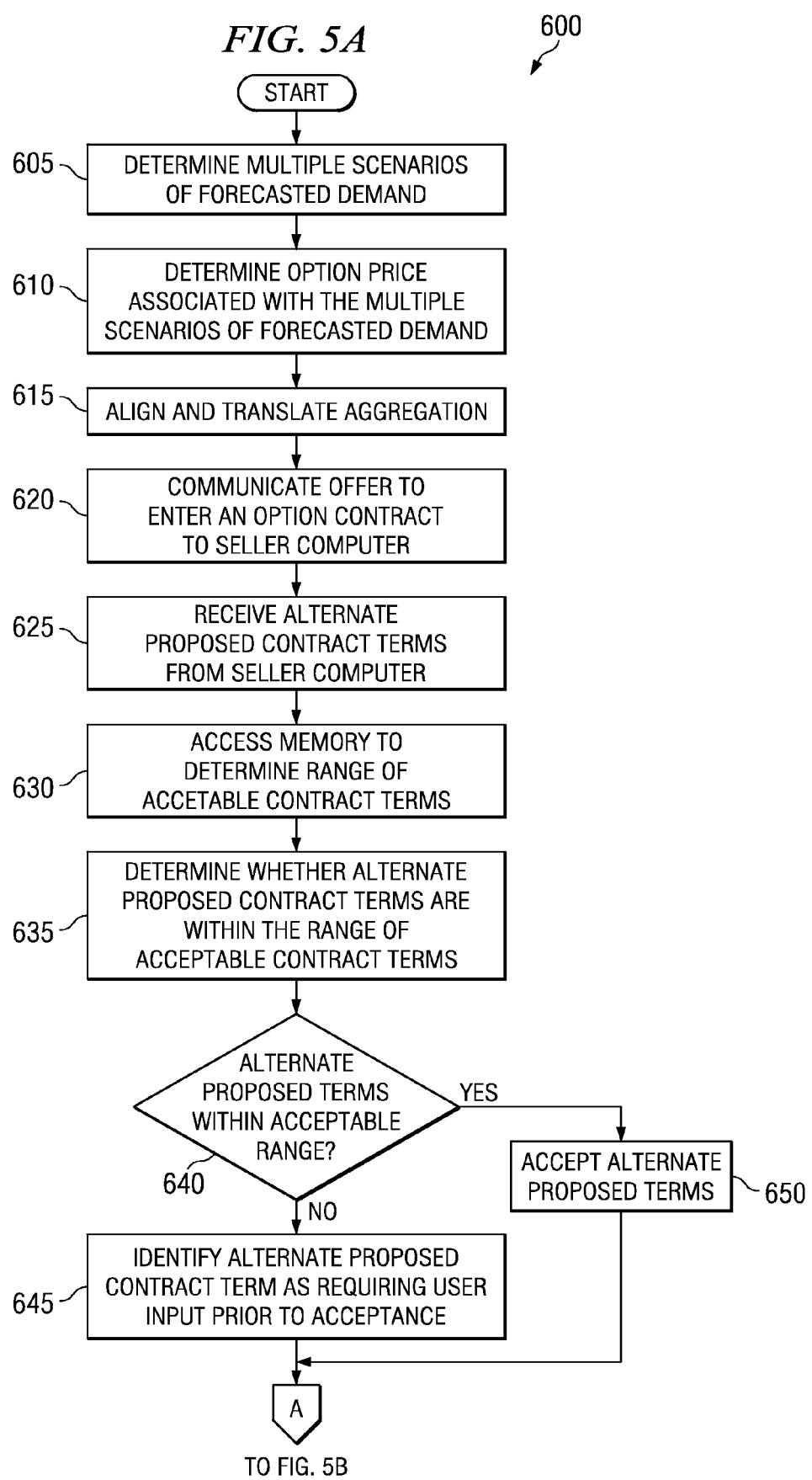

SYSTEM AND METHOD FOR MULTI-ENTERPRISE SUPPLY CHAIN OPTIMIZATION

CROSS-REFERENCE TO RELATED APPLICATIONS

This application is a continuation-in-part (CIP) of U.S. patent application Ser. No. 09/398,170, now U.S. Pat. No. 7,260,550, filed on 17 Sep. 1999 and entitled "SYSTEM AND METHOD FOR MULTI-ENTERPRISE SUPPLY CHAIN OPTIMIZATION", which claims the benefit of U.S. Provisional Application Ser. No. 60/100,981 filed 18 Sep. 1998 entitled "GLOBAL PROCUREMENT DEMAND MANAGER". U.S. patent application Ser. No. 09/398,170 and U.S. Provisional Application Ser. No. 60/100,981 are commonly assigned to the assignee of the present application. The disclosure of related patent application Ser. No. 09/398, 170 and U.S. Provisional Application Ser. No. 60/100,981 are hereby incorporated by reference into the present disclosure as if fully set forth herein.

BACKGROUND

1. Field of the Invention

The present invention relates to the field of data communication and processing, and more particularly to a system and method for optimizing multi-enterprise supply chain agreements.

2. Description of Related Art

Various algorithms have been developed to help optimize supply chains within an enterprise to avoid overstock or undersupply conditions caused by mismatches in supply and demand forecasts. While several algorithms have been developed to address supply chain optimization within a single enterprise, none have addressed supply chain optimization between enterprises.

Conventional approaches to supply chain optimization typically assume that the enterprise may impose supply chain optimization rules on itself without regard to the interests of other enterprises. In the context of multi-enterprise trading where supply chain optimization rules must be negotiated, the typical approaches break down. In the context of multi-enterprise trading, therefore, supply/demand mismatches are common.

Although great strides have been made in the area of supply chain optimization, many short comings remain.

SUMMARY OF THE INVENTION

In accordance with the present invention, a system and method for optimizing multi-enterprise supply chains are provided that substantially reduce or eliminate disadvantages or problems associated with previously developed supply chain optimization techniques.

In one embodiment, a method of optimizing multi-enterprise supply chain agreements using an electronic scenario based option contract comprises creating at a buyer computer a plurality of scenarios of forecasted demand for one or more products and communicating from the buyer computer to a seller computer an offer to enter into an option contract for the supply of the one or more products, the option contract including an option corresponding to each of the plurality of scenarios of forecasted demand. The method further comprises executing the option contract, receiving at the buyer computer an indication of current buyer demand for at least one scenario associated with the one or more products, and exercising at least a portion of the option in the option contract based at least in part on the indicated buyer demand.

In another embodiment, a method of optimizing multi-enterprise supply chain agreements using an electronic scenario based option contract comprises receiving at a seller computer terms of an option contract from a buyer computer, the terms comprising an option corresponding to a buyer's plurality of scenarios of forecasted demand for one or more products, communicating to the buyer computer an acceptance of the terms of the option contract for at least one scenario of the plurality of scenarios, storing the terms of the accepted option contract in a memory accessible to the seller computer and enforcing the terms of the option contract at the seller computer, for at least one scenario of the plurality of scenarios, without user input.

Technical advantages of the present invention include a system and method for optimizing multi-enterprise supply chains. Through a variety of mechanisms, the invention increases the profitability of both parties to the contract. By implementing one or more option terms in the contract, the invention reduces uncertainty in each party's forecasts. Providing one or more dimensions of flexibility to the buyer entity (e.g., options as to quantity, product, geography, etc.) provides value to the buyer entity by providing alternative actions to fulfill market demand, thereby generating revenue through the option that best suits the buyer entities needs. The invention provides a mechanism to ensure a win-win situation for both buying and selling parties by setting an option price to account for the value to the buyer entity and the corresponding cost to the seller entity. In addition, the invention provides an incentive for each party to provide the most accurate forecasts possible by providing for well-defined penalties for violation of the terms of the resulting contract.

The use of a option contract provides a significant advantage in on-line scenario based negotiations between a buyer computer and a seller computer. By using option contracts to specify multiple scenarios each containing a range or aggregation of potential parameter values (such as a range of quantities or products desired, and a range of delivery locations), the invention avoids scores of iterations and transmissions across the communication link coupling the buyer and seller computers, making on-line negotiations technically feasible and very efficient.

These and other advantages and features of the present invention will become readily apparent to those skilled in the art upon examination of the subsequent detailed description and accompanying drawings. Accordingly additional advantages and features of the present invention and the scope thereof are pointed out with particularity in the claims and form a part hereof.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIGS. 2a and 2b are block diagrams of an exemplary buyer computer and an exemplary seller computer, respectively, constructed according to the teachings of the present invention;

DETAILED DESCRIPTION OF THE PREFERRED EMBODIMENT

Reference will now be made to the following detailed description of the preferred and alternate embodiments of the present invention. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
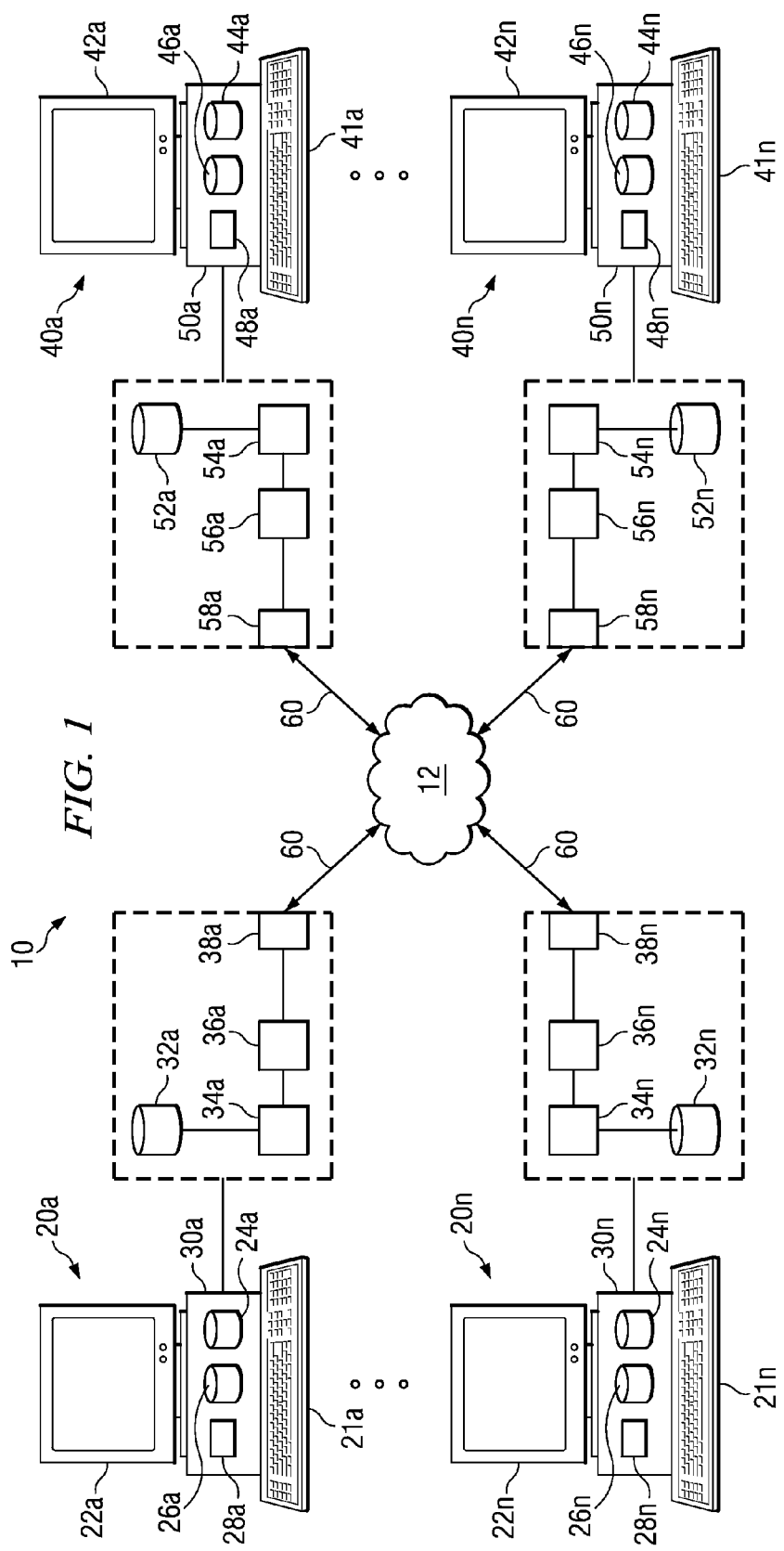
FIG. 1 is a block diagram of an exemplary system for optimizing multi-enterprise supply chains constructed according to the present invention.

FIG. 1 is a block diagram of an exemplary multi-enterprise supply chain optimization system 10 that includes a plurality of buyer computers 20a-20n and a plurality of seller computers 40a-40n. In one aspect of operation, one or more buyer computers 20 communicate with one or seller computers 40 to collaborate in negotiating the supply by a seller and procurement by a buyer of products offered by sellers associated with seller computers 40. Buyer computers 20 and seller computers 40 cooperate to strive toward an optimum supply chain between buyers associated with buyer computers 20 and sellers associated with seller computers 40. Buyer's associated with buyer computers 20 create multiple scenarios of demand to explore various supply chain decision options in an effort to achieve an optimum supply chain. Ideally, through a scenario based interactive negotiation process and contractual monitoring system, system 10 eliminates mismatches between the buyer's demand (i.e., buyer's mutually exclusive groups of demands) and the seller's supply, increasing the profitability of each enterprise. Buyer computers 20 may create multiple scenarios to explore various supply chain decision options.

Each of buyer computers 20 may execute with any of the well-known MS-DOS, PC-DOS, OS-2, MAC-OS, WINDOWS™, UNIX, or other appropriate operating systems. Each buyer computer 10 may comprise, for example, a desktop computer, a laptop computer, a personal digital assistant, or any other computing or communicating device. Each buyer computer 20 includes an input device 21, an output device 22, random access memory (RAM) 24, read-only memory (ROM) 26, CD-ROM, hard drive, or other magnetic or optical storage media 28 or other appropriate volatile or nonvolatile storage and retrieval devices, and a processor 30 having a system clock or other suitable timing device or software.

Input device 21 may comprise, for example, a keyboard, mouse, graphics tablet, touch screen, pressure-sensitive pad, joystick, light pen, microphone, or other suitable input device. Output device 22 may comprise, for example, a video display, a printer, a disk drive, a plotter, a speaker, or other suitable output device.

Items within the dashed lines in FIG. 1 represent exemplary functional operation and data organization of the associated components of system 10. For example, each buyer computer 20 includes or otherwise has access to a memory 32. Memory 32 may comprise any of a variety of data structures, arrangements or compilations operable to store and facilitate retrieval of various information stored locally at buyer computer 20. Although memory 32 is depicted as residing within buyer computer 20, all or any portion of memory 32 could alternatively reside at a remote location accessible to buyer computer 20.

Buyer computer 20 executes one or more software applications 34. As used in this document, the term "software application" refers to a set of instructions, procedures, functions, objects, classes, and/or instances, and related data adapted for implementation in a suitable computer language such as C, CU, Java, or any other appropriate development language. In the illustrated embodiment, software application 34 comprises a procurement manager operable to assist buyer computer 20 in negotiating and executing supply chain contracts with various seller computers 40.

In this embodiment, each of seller computers 40 is similar in structure and function to buyer computers 20. For example, each of seller computers 40 may execute with any of the well-known MS-DOS, PC-DOS, OS-2, MAC-OS, WINDOWS™, UNIX, or other appropriate operating systems and may comprise a computing or communicating device, such as a desktop computer, a laptop computer, or a personal digital assistant. Each seller computer 40 includes an input device 41, an output device 42, random access memory (RAM) 44, read-only memory (ROM) 46, CD-ROM, hard drive, or other magnetic or optical storage media 48 or other appropriate volatile or nonvolatile storage and retrieval devices, and a processor 50 having a system clock or other suitable timing device or software. In addition, each seller computer 40 includes or otherwise has access to a memory 52. Like buyer computer 20, seller computer 40 executes one or more software applications 54. In the illustrated embodiment, software application 54 comprises a supply manager operable to allow seller computer 40 to negotiate and/or execute supply chain contracts with various buyer computers 40.

Buyer computers 20 and seller computers 40 communicate with one another using communication links 60. In the illustrated embodiment, communication links 60 comprise communication media suitable to provide a connection between buyer computers 20 and/or seller computers 40 and a network 12. In this embodiment, network 12 comprises a global computer network, such as the Internet. Network 12 may, however, include any suitable wireline, wireless, or combination wireline/wireless system that supports communication between network elements using ground-based and/or space-based components. For example, network 12 may be public switched telephone networks (PSTN), integrated services digital networks (ISDN), local area networks (LAN), wide area networks (WAN), or other communication systems or combination of communication systems at one or more locations. Communication links 60 and network 12 shown as connecting buyer computers 20 and seller computers 40 may comprise a single network, or separate networks.

Buyer computers 20 and seller computers 40 include interfaces 38 and 58, respectively, to facilitate connection to communication links 60. These interfaces include the appropriate hardware (e.g., modem, network interface card, etc.) and software (e.g., multi-layer protocol support, protocol conversion, data processing, data modulation, etc.) to communicate using a direct connection to a PSTN or ISDN, a connection through a LAN, WAN, or global computer network such as the Internet, or any other suitable communication connection that allows network elements to communicate using communication links 40.

Buyer computers 20 and seller computers 40 also include browsers 36 and 56, respectively. Browsers 36 and 56 may comprise any suitable software, hardware, or combination thereof, operable to facilitate access to—and user interaction with—other network elements. In the illustrated embodiment, browsers 36 and 56 comprises Internet browsers, such as Netscape™ Communicator available from Netscape Communications Corporation, or Microsoft Explorer™, available from Microsoft Corporation. Browsers 36 and 56 may comprise stand-alone functional elements, as shown in the illustrated embodiment. Alternatively, all or a portion of the functionality of browsers 36 and 56 could be integrated into other components of system 10, such as interfaces 38 and 58, respectively.

Throughout this description, components in system 10 store, communicate, and access information using any format, structure, or arrangement including without limitation machine-readable or user-readable text and graphics. In a particular embodiment, information exchanged in system 10 includes documents or files written in hypertext mark-up language (HTML), HTML Plus, standard generalized mark-up language (SGML), virtual reality mark-up language (VRML), extended markup language (XML), java objects, or any other appropriate content development language. Information in system 10 may also include program code, such as applets written in JAVA developed by SUN MICROSYSTEMS, or other appropriate self-executing code.

In operation, system 10 facilitates collaborative scenario based negotiations between one or more buyer computers 20 and one or more seller computers 40 to result in an electronic option contract for the supply of particular products to buyers utilizing system 10. In addition, the electronic option contract may contain multiple scenarios of demand and/or alternate scenarios of demand for each of the particular products. Either buyer computer 20 or seller computer 40 may initiate a negotiation by transmitting proposed contract terms to the other machine.

In a particular embodiment, buyer computer 20 and seller computer 40 may negotiate a scenario based option contract for the supply and purchase of multiple groups of particular products offered by a seller associated with seller computer 40. The resulting option contract contains multiple scenarios containing one or more options, which specify obligations of the buyer entity with respect to the purchase of a product, and an obligation of the seller entity with respect to the supply of that product. In a particular embodiment, the option may specify a minimum obligation of the buyer in purchasing the product and a maximum obligation of the seller in supplying the product. The option, however, could relate to any level of obligation between the parties.

In addition, as discussed above, the resulting option contract contains multiple scenarios including alternate scenarios. The various scenarios each contain one or more options, which also specify obligations of the buyer entity with respect to the purchase of one or more products, and an obligation of the seller entity with respect to the supply of the one or more products.

The option contract may further include an option price representing a payment of the buyer entity to the seller entity for the value of the option to the buyer entity and the cost of the option to the seller entity. In addition, the option contract may include penalty provisions for deviation from the terms of the contract.

The use of an option contract provides a significant advantage in on-line negotiations between buyer computer 20 and seller computer 40. Without the use of an options contract, each computer 20 and 40 of system 10 would have to run an optimization algorithm on particular parameter values, obtain a result, and pass the intermediate result to the other machine over network 12, where that result would be evaluated, modified, and retransmitted back to the other machine. This process would continue until an apparently optimum value was reached. By using option contracts to specify multiple scenarios of demand, each of the multiple scenarios may contain a range or aggregation of potential parameter values (such as a scenario containing a range of quantities or products desired and/or a range of delivery locations and another scenario containing a different range of quantities or products desired and/or a different range of delivery locations), system 10 avoids scores of iterations and transmissions across network 12, and instead allows each computer 20 and 40 to process multiple scenarios without transmitting intermittent communication back and forth across network 12.

Once the terms of the contract have been negotiated, the option contract is executed. In a particular embodiment, the terms of the executed option contract are stored at the buyer computer 20 and the seller computer 40. Storing the contract terms facilitate monitoring each party's progress in fulfilling of its contractual obligations. In addition, system 10 may enforce the terms of the contract by, for example, prohibiting buyer computer 20 from exercising the buyer entity's options in a manner inconsistent with the contract's terms, or by assessing penalties for violation of contract's terms.

Through the use of electronic option contracts, system 10 increases supply chain efficiency by providing a comfortable level of certainty in the obligations of each party, while maintaining adequate flexibility to avoid supply/demand mismatches.

FIGS. 2a and 2b are block diagrams of an exemplary buyer computer 20 and an exemplary seller computer 40, respectively. Buyer computer 20 includes a memory 32, a procurement manager 34, a browser 36, and an interface 38. Similarly, seller computer 40 includes a memory 52, a supply manager 54, a browser 56, and an interface 58.

Elements of buyer computer 20 communicate with one another over a communication link 110. Communication link 110 may comprise any suitable arrangement of hardware and/or software operable to facilitate communication between elements within or peripherally coupled to buyer computer 20. For example, communication link 110 may comprise a universal serial bus. Elements of seller computer 40 communicate with one another over a communication link 210. Communication link 210 of seller computer 40 is similar in structure and function to communication link 110 of buyer computer 20.

In the illustrated embodiment, procurement manager 34 and supply manager 54 each include a variety of modules responsible for providing particular functionality and processing capabilities. The particular number and arrangement of modules shown in FIGS. 2a and 2b are for illustrative purposes only. Other and/or additional arrangements, configurations, relationships, and processing divisions could be incorporated without departing from the scope of the invention.

In one embodiment, procurement manager 34 includes a forecast module 112. Forecast module 112 operates to provide estimates of the buyer entity's future demand based, for example, on historical demand and projected market changes. In addition or as an alternative, forecast module 112 operates to provide multiple scenario based demand wherein each scenario within the multiple scenarios provides mutually exclusive estimates of the buyer entity's future demand. In another embodiment, supply manager 54 of seller computer 40 includes a forecast module 212. Forecast module 212 may provide estimates of the seller's supply capacity, and may also estimate various customers' projected demand based, for example, on a past course of dealing with that customer. In addition or as an alternative, forecast module 212 may provide estimates of the multiple scenario based demand wherein each estimate for each scenario within the estimates of the multiple scenarios may provide mutually exclusive groups of estimates of the seller's supply capacity.

Buyer computer 20 and seller computer 40 may be configured to share information, such as the assumptions each is using in calculating its estimate. By sharing information and allowing each entity to critique the other's forecasts and underlying assumptions, system 10 provides an additional advantage of facilitating collaborative forecasting, which provides more accurate forecasts resulting in increased efficiency due to fewer mismatches in supply and demand.

Procurement manager 34 and supply manager 54 also include negotiation modules 114 and 214, respectively. Negotiation modules 114 and 214 operate to conduct scenario based negotiations between buyer computer 20 and seller computer 40 with respect to terms of the contract being negotiated. In a particular embodiment, negotiation modules 114 and 214 may be configured to conduct all or a part of the negotiations between buyer computer 20 and seller computer 40 without requiring user input.

To further facilitate negotiations between buyer computer 20 and seller computer 40, procurement manager 34 and supply manager 54 include aggregation modules 116 and 216, respectively. Aggregation modules 116 and 216 cooperate to align and perform any desirable transformation of parameters being negotiated. For example, certain contract parameters may be expressed as multiple scenarios, as alternate scenarios, or as an option within the various scenarios. Aggregation module 116 ensures consistency between the underlying parameters on which each machine bases its computations, so that both parties have a consistent understanding of the terms of the resulting contract.

Procurement manager 34 and supply manager 54 may also include option scenario analyzer (SA) modules 117 and 217, respectively. Scenario analyzer module 117 of buyer computer 20 creates multiple scenarios of demand including alternate scenarios based on the estimates of the buyer entity's future demand. Scenario analyzer module 217 of seller computer 40 translates the multiple scenarios of demand including the alternate scenarios into seller's scenarios based on seller's particular products and/or seller's supply capacity. The multiple scenarios of demand ultimately transmitted to seller computer 40 reflects a balance between the estimates of the buyer entity's future demand and the viability of the different scenarios for buyer entity's supply needs. For example, a buyer entity may require a particular number of products at location A, or in the alternative, may require part of the particular number of products at location A and the remainder of the particular number of products at location B and/or location C.

Procurement manager 34 and supply manager 54 may also include option price modules 118 and 218, respectively. Option price module 118 of buyer computer 20 estimates the value to the buyer of having flexibility to specify the buyer's obligation as multiple and/or alternate scenarios instead of, for example, a fixed obligation. Option price module 218 of seller computer 40 estimates the cost to the seller of having a higher potential supply obligation under the contract than the buyer's potential obligation to purchase. The option price ultimately contained in the option contract reflects a balance between the flexibility gained by the buyer entity and the cost to the seller entity of facilitating that flexibility, and may also reflect the relative bargaining strength of the parties involved. For example, a dominant buyer may be in a position to demand an option without paying any option price, or by paying a lower option price.

Procurement manger 34 and supply manager 54 further include execution modules 119 and 219, respectively. Execution modules 119 and 219 operate to execute the option contracts and to store the terms of the option contracts in memories 32 and 52, respectively.

Procurement manager 34 and supply manager 54 may also include tracking modules 120 and 220, respectively. Tracking modules 120 and 220 allow buyer computer 20 and seller computer 40 to monitor and enforce the terms of any currently pending contract.

Memory 32 of buyer computer 20 includes a variety of files. In the illustrated embodiment, memory 32 includes a buyer information file 130, which may store various information relating to the buyer entity's business, as well as its historical and projected supply needs. Forecast module 112 and/or aggregation module 116 may access buyer information file 130 to obtain information helpful in forecasting supply needs and performing any necessary aggregate transformation during negotiations with seller computer 40.

Memory 32 further includes a contract information file 132, which stores information relating to currently pending contracts. Tracking module 120 may access contract information file 132, to observe and/or modify information associated with currently pending contracts as the contracts progress. Memory 32 may further include negotiation information file 134, which includes various information useful in negotiating the terms of a contract. For example, negotiation information file 134 may include historical price lists, previous discounts offered by the seller entity or competitors of the seller entity, acceptable delivery schedules, and other information relating to previously negotiated contracts. Negotiation module 114 may access negotiation information file 134 in determining whether to accept suggested contractual terms, counter-offer, or flag a particular issue as a problem requiring user attention.

Memory 52 of seller computer 40 contains similar information files. For example, memory 52 includes a seller information file 230 containing various information relating to the seller entity's business, as well as its historical and projected ability to meet demand needs (i.e., buyer's mutually exclusive groups of demands). Forecast module 212 and/or aggregation module 216 may access seller information file 230 to obtain information helpful in forecasting the seller entity's inventory and ability to meet various projected scenario based demand needs, as well as to perform any necessary aggregate transformation during negotiations with seller computer 40.

Memory 52 further includes a contract information file 232, which stores information relating to currently pending contracts. Tracking module 220 may access contract information file 232, to observe and/or modify information associated with currently pending contracts as the contracts progress. Memory 32 may further include negotiation information file 234, which includes various information useful in negotiating the terms of a contract. For example, negotiation information file 234 may include price lists previously given to particular buyers, discounts available to particular buyers, acceptable delivery schedules, and other information relating to previously negotiated contracts. Negotiation module 214 may access negotiation information file 234 in determining whether to accept suggested contractual terms, counter-offer, or flag a particular issue as a problem requiring user attention.

In operation, forecast module 112 of buyer computer 20 may initially approximate its scenario based supply needs by applying current and/or historical supply data to various supply forecasting and optimization models to yield approximate supply needs. These supply needs may be expressed in terms of, for example, a product type, a quantity of product, and/or a geographical region. In addition, scenario analyzer module 117 of buyer computer 20 may combine the initial approximate supply needs into various scenarios to analyze each mutually exclusive group of supply needs. For example, buyer computer 20 may require 1000 of product P1 at location A and 700 of product P2 at location B or in the alternative 800 of product P1 at location A, 400 of product P2 at location C, and 200 of product P3 at location D.

Known information may suggest that it is appropriate to rely on the accuracy of one or more of the approximations. For example, it may be known that an enterprise in particular geographical region may currently be out of stock of a particular product; it may further be known that the enterprise has a need for that product by a particular date. In that case, the particular product, geographic region of the enterprise, and delivery date may be specified with confidence.

In other cases, for various reasons, such as uncertainty in market conditions, the approximations yielded by the forecasting and optimization models may be suspect or uncertain. Continuing with the previous example, while it may be known that a particular enterprise in a particular geographical location will require some level of a particular product by a specified date, the exact quantity required may not be ascertainable with any certainty. Scenario analyzer module 117 may account for this uncertainty by specifying multiple scenarios including alternate scenarios based on different quantity parameters of potential values, or as an option to purchase particular products according to various scenarios.

Buyer computer 20 may, through negotiation module 114, derive suggested contractual terms, such as the price of the product, the execution date of the contract, an exercise date or range of exercise dates for each of the multiple scenarios identified by scenario analyzer module 117, and/or any other term desired to be included in a supply contract. Negotiations module 114 may consult, for example, buyer information file 130 and/or negotiation information file 134 in deriving the suggested contractual terms.

Buyer computer 20 communicates the suggested contractual terms, including forecasted supply requirements, expressed as multiple scenarios of supply needs, to seller computer 40 associated with the seller supplying the desired product or products. Negotiation modules 114 and 214 of buyer computer 20 and seller computer 40, respectively, begin with the suggested contract terms and negotiate the terms of a scenario based option contract for the supply of the desired product(s). Prior to or during the negotiation process, aggregation modules 116 and 216 may perform any necessary or desired aggregation alignment and/or transformation. Aggregation modules 116 and 216 may access buyer information file 112 and seller information file 212 to determine a common aggregation of parameters to be implemented in the contract.

Figure 3A:
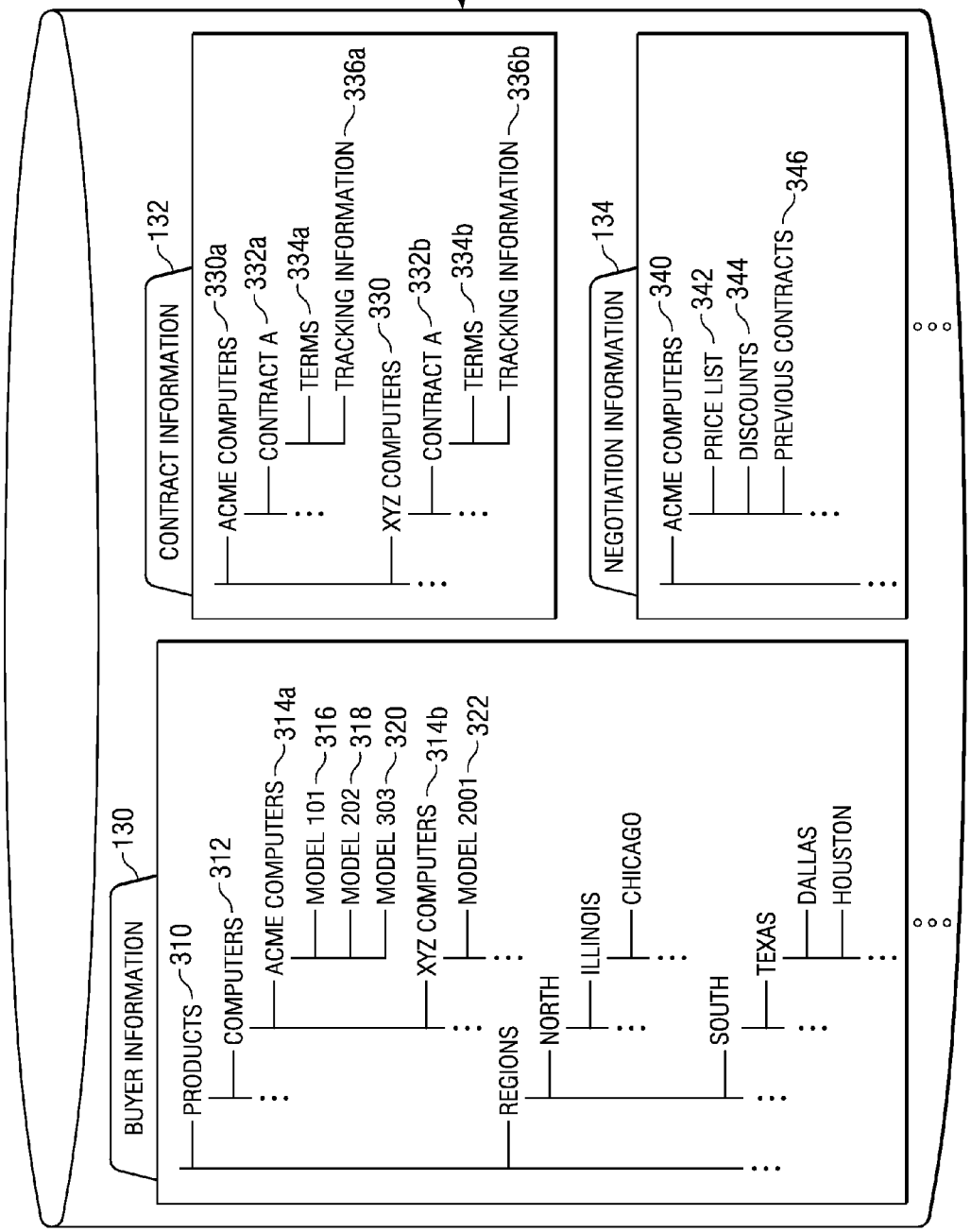
FIGS. 3a and 3b are block diagrams of an exemplary portion of a memory accessible to a buyer computer and an exemplary portion of a memory accessible to a seller computer, respectively, constructed according to the present invention.
Figure 3B:
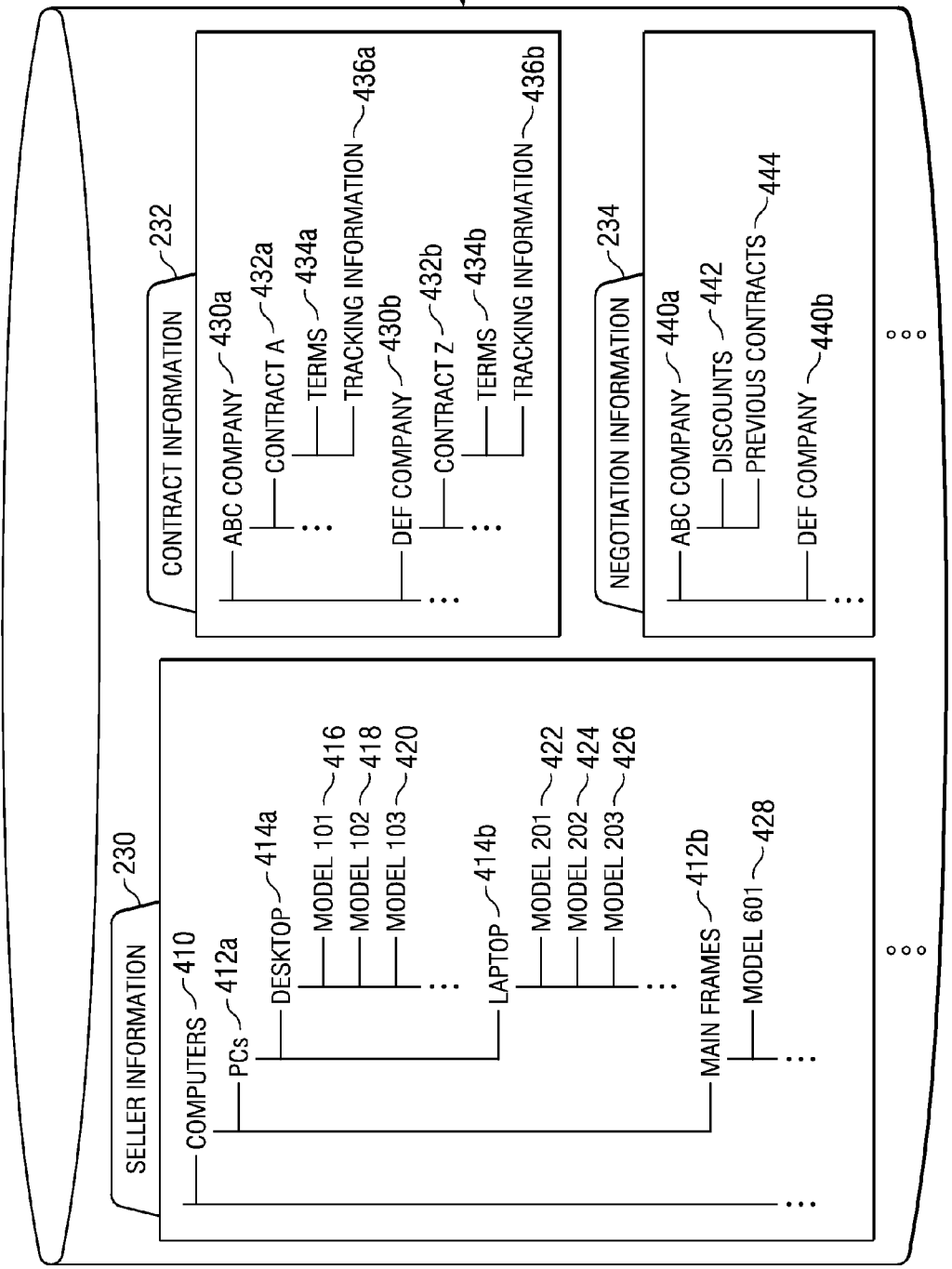

FIGS. 3*a* and 3*b* are block diagrams of an exemplary portion of memory 32 associated with buyer computer 32 and of memory 52 associated with seller computer 40, respectively. In the illustrated embodiment, buyer information file 130 includes product information 310, which comprises a compilation of various information related to the products that the buyer entity using buyer computer 20 uses. In this example, product information 310 is arranged by product type 312; each product type 312 is further arranged by vendor 314, and then by product model 316-322.

Seller information file 230 of memory 52 also includes product information 410, which is similar to product information 310 stored in memory 32. However, product information 410 stored in memory 52 comprises a slightly different aggregation than product information 310 stored in memory 32. To ensure that buyer computer 20 and seller computer 40 are able to negotiate consistent contractual terms, it may be desirable to use aggregation modules 116 and 216 to determine a common aggregation of parameters. In this case, buyer computer 20 arranges its product information 310 by product type, vendor, and model number; seller computer 40 arranges its product information 410 by product type, product sub-type 412, product application 414, and model 416-428. To provide a consistent aggregation, aggregation module 116 of buyer computer 20 may temporarily reaggregate buyer product information 310 to be consistent with seller product information 410. For example, aggregation module 116 may disaggregate the buyer product information 310 down to its most granular level (in this case, model numbers 316-322) and then build an aggregation to match that of seller product information 410.

As a particular example, buyer computer 20 may suggest as one scenario in the multiple scenarios a contract option comprising an offer to purchase a quantity of "desktop computers." The aggregation of "desktop computers" would commit the buyer entity to purchase some number of the seller entity's desktop computers, but give the buyer entity flexibility in selecting which particular model or models to purchase until a later date. Aggregation modules 116 and 216, therefore, facilitate specification of ranges of obligations that each party is willing to undertake. The parameters expressed as a range of possible values may ultimately be incorporated into the option contract in the form of an option.

The options ultimately incorporated into the option contract may specify a range of values which represents an obligation on the buyer entity to purchase the product and an obligation on the seller entity to supply the product. Although the previous example suggested one scenario including an option as to the particular product models selected, similar scenarios could be created that specify, for example, a range of quantity of a particular product desired, a range of geographical regions to be served, and/or various other attributes associated with the buyer entity's supply needs. Resulting contracts have multiple scenarios wherein each scenario within the multiplicity of scenarios may have one or several dimensions of options. For example, a resulting scenario based option contract may specify the delivery location (region), but may create an option as to the exact product to be delivered and the exact quantity demanded. Any combination of the multiple scenarios may contain one or more options as to region, product, quantity, or other appropriate parameter could be implemented without departing from the scope of the invention.

Facilitating negotiation of a scenario based option contract provides an advantage to the buyer enterprise in allowing the buyer enterprise to defer the determination of the exact scope of its obligations until a later time, when the buyer entity may more accurately determine its actual supply needs. This flexibility, however, comes at a cost to the seller entity, who must be prepared to meet the maximum contractual obligation even if the buyer entity ultimately chooses a narrower contractual scope. The seller entity may, therefore, desire compensation for this added cost in the form of an option price.

As part of the negotiation process, buyer computer 20 and seller computer 40 may determine an option price based, for example, on the value of the option to the buyer entity and the cost of the option to the seller entity. Generally, the greater the flexibility offered to the buyer entity, the higher the cost to the seller entity, and the higher the option price. In determining the option price, option price module 118 of buyer computer 20 may determine the value of a particular option range to the buyer entity. Likewise, option price module 218 of seller computer 40 may determine the seller entity's cost of providing that option. Through an iterative process, buyer computer 20 and seller computer 40 may determine an option range associated with an option price acceptable to both the buyer and the seller.

Continuing with the negotiation process, negotiation modules 114 and 214 may access negotiation information files 134 and 234 to ascertain acceptable compromises in parameter values, such as, price, quantity, delivery locations, and/or delivery timing. Negotiation information files 134 and 234 comprise information, such as, price lists 342; previous discounts offered 344, 442; and other previous contractual terms 346, 444. Negotiation modules 114 and 214 may be programmed to accept proposed contract terms provided that they fall in a given range or bear a particular relation to previously negotiated terms. In addition, negotiation modules 114 and 214 may be programmed to flag certain contractual terms as problem issues, which require user intervention and negotiation.

Once the terms of the option contract are negotiated, execution modules 119 and 219 of buyer computer 20 and seller computer 40 and/or the users of those machines execute the option contract. In the illustrated embodiment, both buyer computer 20 and seller computer 40 store the terms of the option contract in memories 32 and 52, respectively. Referring again to FIGS. 3a and 3b, the negotiated contractual terms are stored in contract information files 132 and 232 of buyer computer 20 and seller computer 40, respectively.

In the illustrated embodiment, contract information files 132 and 232 store information relating to each contract 332 and 432, respectively. Among the information stored is the terms of the contract 334 and 434, and tracking information 336 and 436. Tracking modules 120 and 220 of buyer computer 20 and seller computer 220, respectively, may access contract information files 132 and 232, respectively, to monitor and enforce the performance of the negotiated contracts.

Figure 4:
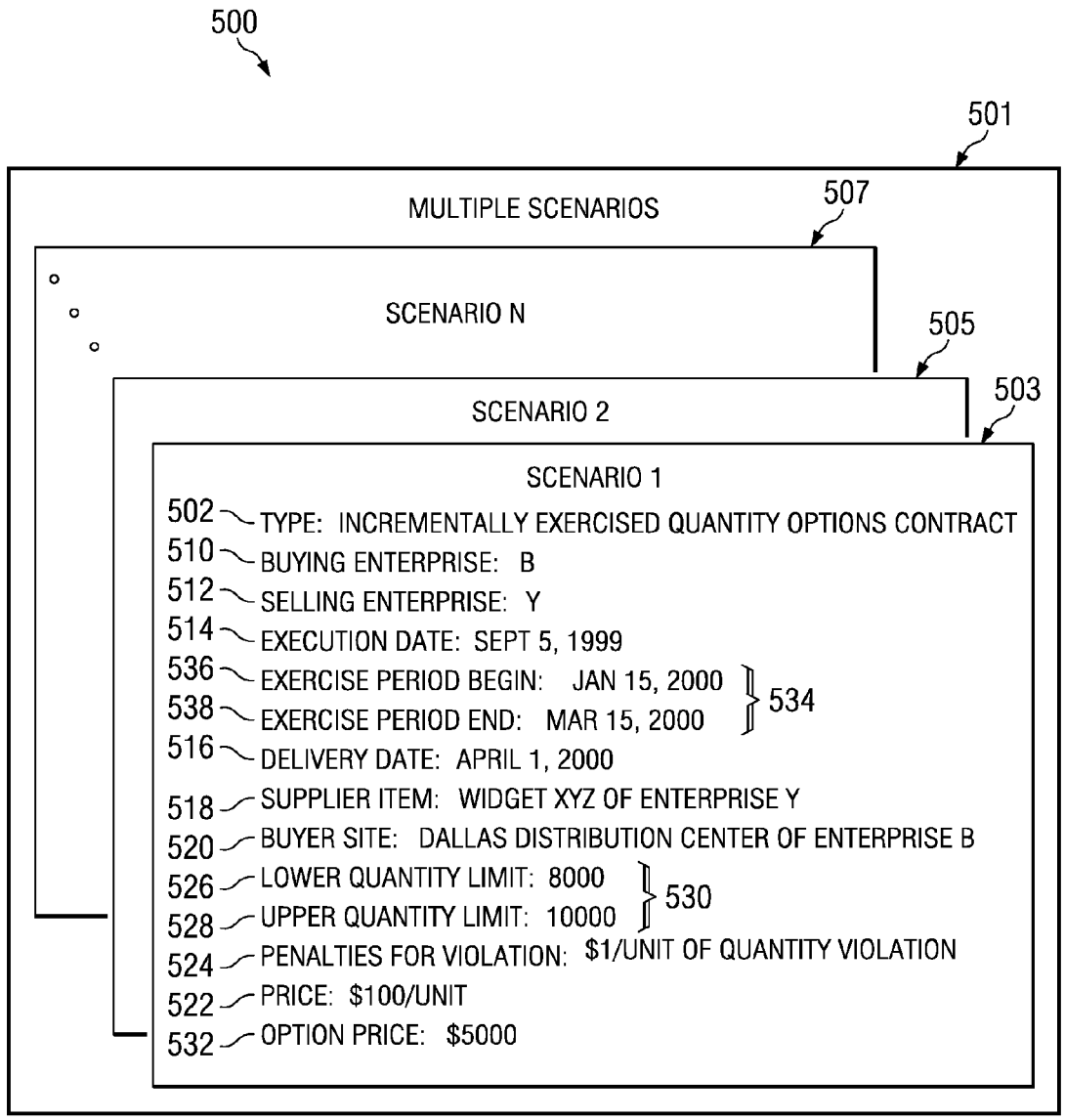
FIG. 4 shows exemplary terms of an option contract executed between a buyer computer and a seller computer according to the present invention.

FIG. 4 shows an example of terms of an option contract 500 executed by buyer computer 20 and seller computer 40. Option contract 500 contains multiple scenarios 501. Multiple scenarios 501 contain various scenarios, for example, scenario 1 503 and scenario 2 505 through scenario N 507. The various scenarios may include alternate scenarios and each of the various scenarios may contain one or more options, which may also specify obligations of the buyer entity with respect to the purchase of a product, and obligations of the seller entity with respect to the supply of that product. For example, among the terms of the option contract is an identification of: the buying enterprise 510, the selling enterprise 512, the execution date 514, the delivery date 516, the product to be delivered 518, the delivery location 520, the sales price 522, and a penalty provision 524 to be exercised in the event of a violation of the terms of option contract 500.

Also among the terms of contract 500 is an indication of the contract type 502. In scenario 1 503, buyer computer 20 and seller computer 40 have negotiated an incrementally exercised quantity options contract. The optional term in this contract is the precise quantity that the buyer entity will be obligated to purchase and that the seller entity will be obligated to supply. Contract terms 526 and 526 specify the upper and lower limits, respectively, of the quantity option 530. According to this contract, the buyer entity will ultimately be responsible for purchasing at least 8,000 units; the seller will be responsible for supplying up to 10,000 units. For this option, the parties have negotiated an option price 532 of $5,000.

Scenario 1 503 also specifies a range of exercise dates 534 specifying the earliest possible date 536 that the buyer entity may exercise its option under contract 500, and the latest possible date 538 by which the buyer entity must exercise its option under contract 500. This particular contract is an incrementally exercised contract. Under this type of contract, beginning at the exercise start period 536, the buyer entity may incrementally place several individual orders for the desired product over the course of the exercise period 534. The seller entity has agreed to supply the cumulative total of all orders placed during the exercise period. This type of contract is particularly advantageous to the buyer entity, as it allows the buyer entity to estimate a flexible range of quantity over a range of time. The buyer entity may then place purchase orders according to its actual demand during the exercise period, greatly reducing or eliminating the chances of supply demand mismatches.

In processing this type of contract, seller computer 40 accepts buyer computer 20's orders after the beginning exercise date 536. Seller computer 40 receives purchase orders as long as the cumulative amount of product ordered does not exceed the upper quantity limit 528 specified in contract 500 and until the exercise end date 538. Seller computer could, of course, be programmed to accept purchase orders specifying a quantity greater than upper quantity limit 528 or orders received before the beginning exercise date 536 or after the exercise end date 538. Under the terms of contract 500, however, seller computer 40 is not required to accept such orders.

Seller computer 40 stores a record of each purchase order received and, after expiration of the exercise period 534, facilitates delivery of a cumulative total order not exceeding upper quantity limit 528. If buyer computer 20 fails to reach the lower quantity limit 526 by the end of the exercise period 538, seller computer 40 may impose penalty 524 in an amount commensurate with the buying entity's shortfall in purchase orders. By the same token, if the seller entity fails to deliver a valid quantity of product, or delivers the product too late or to the wrong destination, buyer computer 20 may impose penalty 524 for the seller entity's violation.

System 10 provides significant advantages in optimizing supply chains in a multi-enterprise trading environment. Through a variety of mechanisms, system 10 increases the profitability of both parties to the contract. By using one or more option terms in the contract, system 10 reduces uncertainty in each party's forecasts. Providing one or more dimensions of flexibility to the buyer entity (e.g., options as to quantity, product, geography, etc.) provides value to the buyer entity in allowing it to later select optimum exercise values for the option parameters-reducing supply/demand mismatches. System 10 provides a mechanism to ensure a win-win situation for both parties by setting an option price to account for the value to the buyer entity and the corresponding cost to the seller entity. In addition, providing for well-defined penalties for violation of the terms of the resulting contract provides an incentive for each party to provide the most accurate forecasts possible.

Figure 5B:
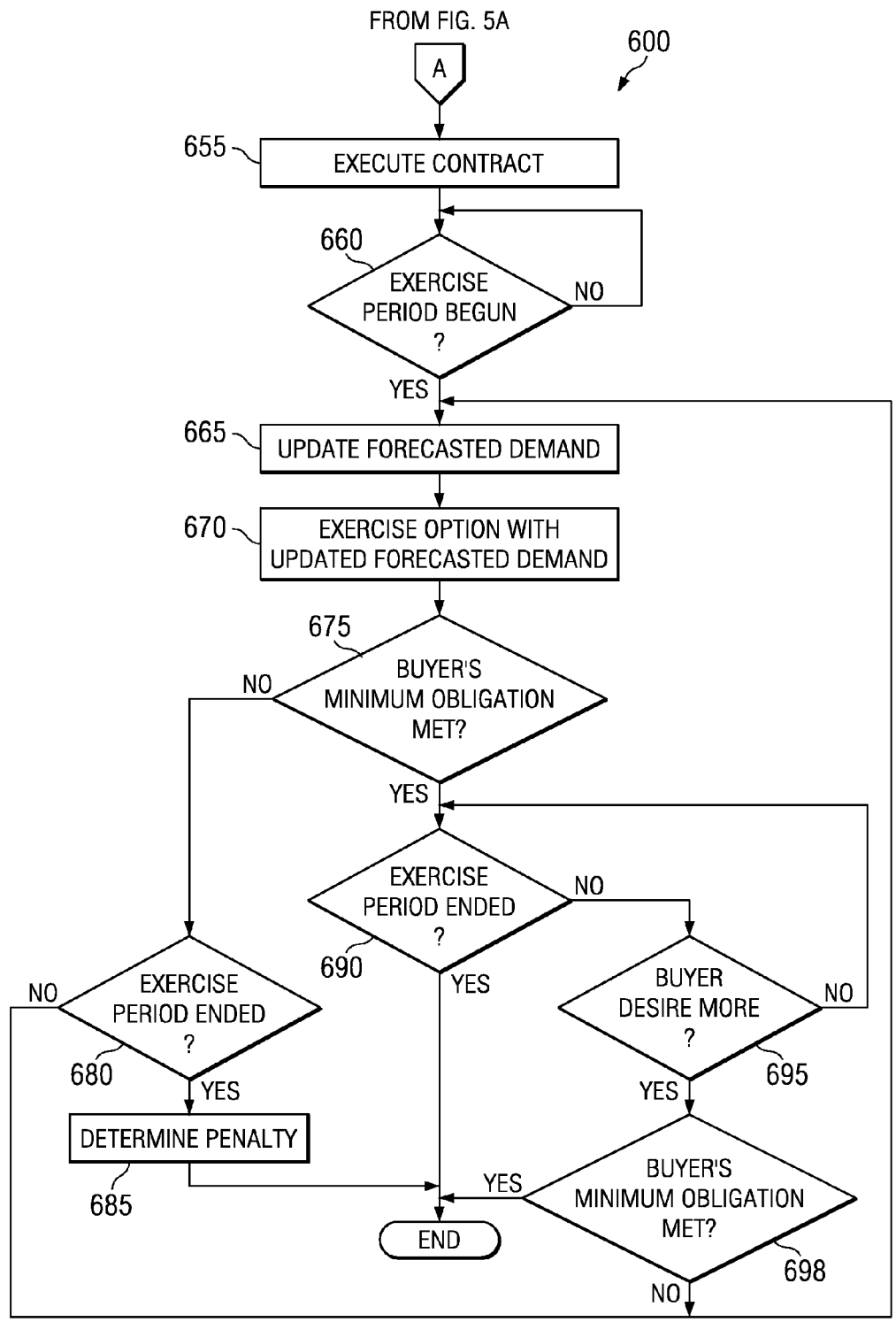
FIG. 5 is a flow chart showing an exemplary method of optimizing multi-enterprise supply chain agreements using an electronic scenario based option contract.

FIG. 5 is a flow chart showing an exemplary method 600 of optimizing multi-enterprise supply chain agreements using an electronic scenario based option contract. In this particular example, the method 600 describes a process for implementing an electronic incrementally exercised option contract 500 (FIG. 4). The method begins at step 605 where buyer computer 20 determines multiple scenarios of the buyer entity's forecasted demand. For example, forecast module 112 of buyer computer 20 initially approximates the buyer's demand by applying current and/or historical data to various demand forecasting and optimization models to yield an approximate forecasted demand. Based on, for example, statistical models identifying historical or estimated errors in the forecasted demand, forecasting module 112 identifies each scenario within the multiplicity of scenarios for providing mutually exclusive groups of the buyer entity's forecasted demand which accounts for these potential errors.

In addition, scenario analyzer module 118 of buyer computer 20 creates multiple scenarios including alternate scenarios based on the approximate forecasted demand at step 610. For example, as discussed above, a buyer entity may require a particular number of products at location A, or in the alternative, require part of the particular number of products at location A and the remainder of the particular number of products at location B and/or location C. Scenario analyzer module 118 of buyer computer 20 creates a scenario wherein the buyer entity's forecasted demand is a particular number of products at location A and creates an alternate scenario wherein the buyer entity's forecasted demand is part of the particular number of products at location A and the remainder of the particular number of products at location B and/or location C.

Buyer computer 20 also determines an option price associated with the multiple scenarios of the buyer entity's forecasted demand at step 610. For example, option price module 118 may determine the value of the flexibility gained by the various scenarios of forecasted demand (as opposed to a fixed forecasted demand) and assign an option price corresponding to that value. At some point, preferably prior to negotiating with seller computer 40, buyer computer 20 may contact seller computer 40 and perform aggregation alignment and translation at step 615. For example, aggregation module 116 of buyer computer 20 may communicate with aggregation module 216 of seller computer 40 to establish a common aggregation of contract terms. Buyer computer 20 communicates an offer to enter into a scenario based option contract to seller computer 40 at step 620. The offer to enter into an option contract includes an option corresponding to the multiple scenarios of the buyer entity's forecasted demand identified by buyer computer 20, and may also include a proposed option price.

Typically, buyer computer 20 will receive alternate proposed contract terms from seller computer 40 at step 625. Negotiation module 114 may analyze the alternate proposed contract terms by accessing memory 32 to determine a range of acceptable contract terms at step 630, and determining at step 635 whether the alternate proposed contract terms are within the range of acceptable contract terms retrieved from memory 32. If negotiation module 114 determines at step 640 that the alternate proposed terms are within the acceptable range retrieved from memory 32, negotiation module 114 may accept the alternate proposed terms without user input at step 650. In the event that negotiation module 114 determines at step 640 that the alternate proposed terms are not within the acceptable range retrieved from memory 32, negotiation module 114 may identify the alternate proposed contract term or terms as requiring user input prior to acceptance at step 645. A user of buyer computer 20 may intervene to negotiate the nonaccepted proposed term, and execution module 119 may execute the contract at step 655. In addition, execution module 119 may store the terms of the executed contract in contract information file 132 of memory 32.

In this particular example, the executed contract 500 (see FIG. 4) is an incrementally exercised option contract. In addition, it is recalled from the above discussion that option contract 500 contains multiple scenarios 501 and may contain, for example, scenario 1 503 and scenario 2 505 through scenario N 507. Although option contract 500 is shown and described with particular scenarios, embodiments of the present invention contemplate any number of scenarios or any number of mutually exclusive groups of demand contained within option contract 500.

Tracking module 120 determines at step 660 whether the exercise period 534 has begun. Anytime after exercise period 534 has begun, tracking module 120 may initiate, or act in response to a user input requesting an update of the buyer's forecasted demand. Forecasting module 112 updates the buyer's forecasted demand to determine the buyer's current demand needs. Exercise module 121 communicates a request to seller computer 40 to exercise the option in the contract according to the updated forecasted demand at step 670. Tracking module 120 stores the value of the updated forecasted demand in contract information file 132 of memory 32.

Tracking module 120 next determines at step 675 whether the exercise of the option satisfies the buyer's minimum obligation, in this case specified by lower quantity limit 526 of contract 500. If the buyer's minimum obligation has not been met, tracking module 120 determines at step 680 whether the exercise period has ended. If the exercise period has ended, and the buyer's minimum obligation has not been met, tracking module 120 determines a penalty at step 685 for the buyer's short fall in its minimum obligation. If, however, tracking module 120 determines at step 680 that time remains in the exercise period, tracking module 120 awaits another update to the buyer's forecasted demand at step 665.

Even where the buyer's minimum obligation has been met at step 675, the terms of contract 500 allow buyer computer 20 to place further purchase orders prior to the expiration of the exercise period. For example, procurement manager 34 may determine at step 690 that despite the buyer's minimum obligation being met, the exercise period has not ended. If buyer computer 20 received an indication, either through user input or through information stored in memory 32, that the buyer entity desires more product at step 695, procurement manager may communicate another updated forecast demand at step 665 requesting additional product. In a particular embodiment, procurement manager 34 may be programmed to refuse to communicate another updated forecast demand if it determines at 698 that the seller's maximum obligation has been met. For example, contract 500 specifies an upper quantity limit 528 of ten thousand units. If buyer computer 20 has already requested ten thousand units, procurement manager 34 may be programmed to disallow further requests to seller computer 40.

Figure 6A:
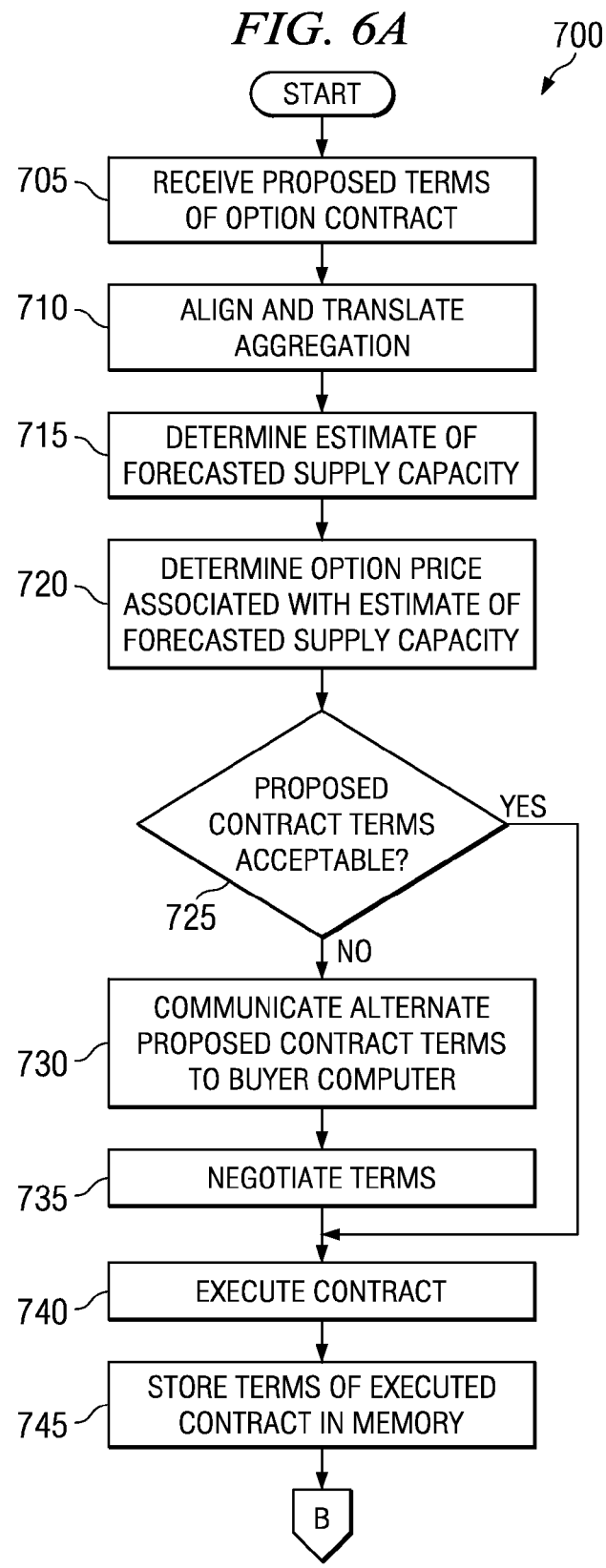
FIG. 6 is a flow chart showing another exemplary method of optimizing a multi-enterprise supply chain agreement using an electronic scenario based option contract.
Figure 6B:
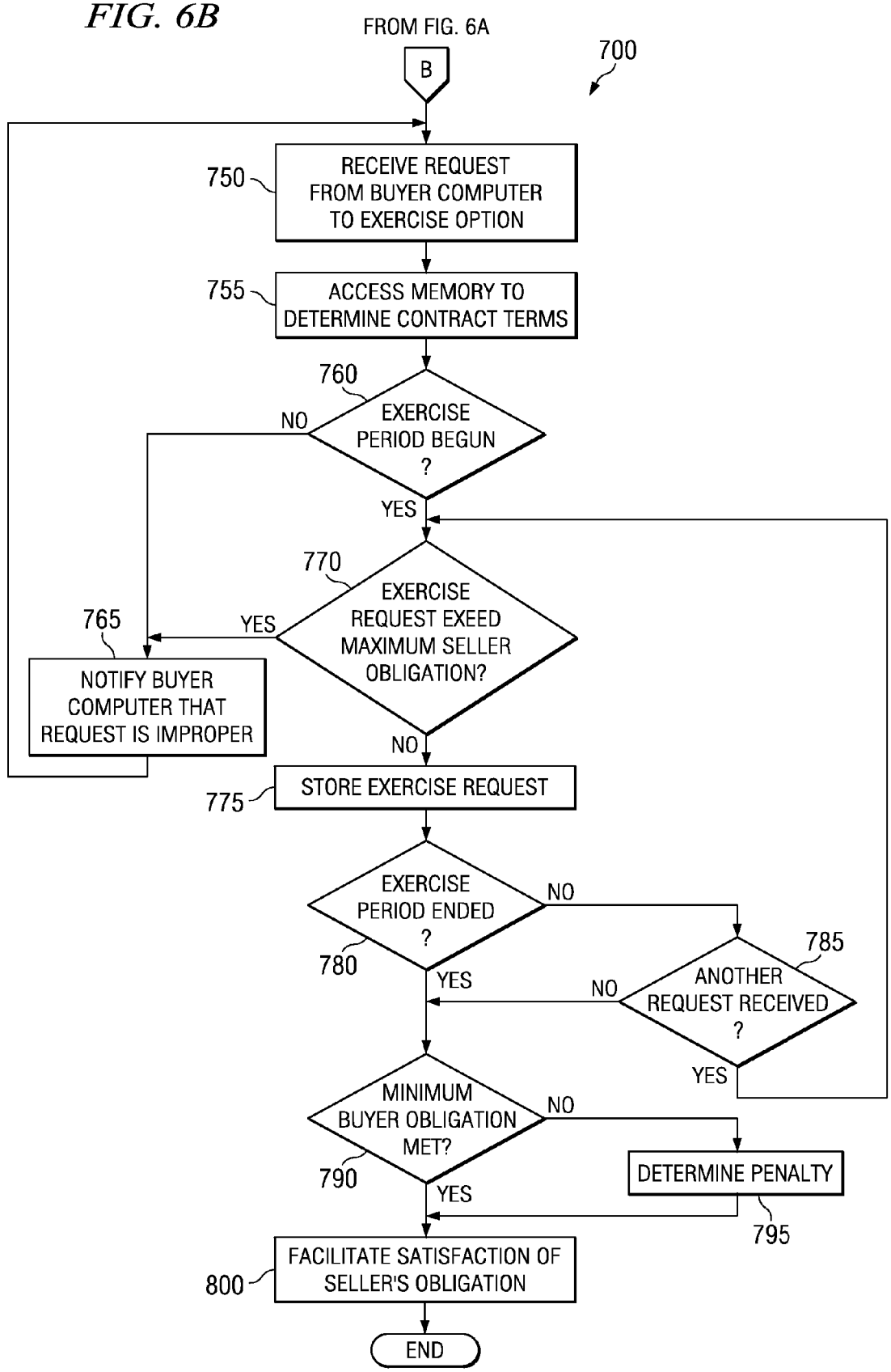

FIG. 6 is a flow chart showing an exemplary method of optimizing a multi-enterprise supply chain agreement. Method 700 begins at step 705 where supply manager 54 of seller computer 40 receives proposed terms of an option contract 500 from buyer computer 20. Aggregation module 216 may align and translate the aggregation of parameters in option contract 500 at step 710.

Typically, forecast module 212 will determine an estimate of the seller's forecasted supply capacity at step 715 and an option price associated with the estimate of the seller's forecasted supply capacity at step 720. In addition, scenario analyzer module 217 of seller computer 40 translates the multiple scenarios of demand including alternate scenarios of demand into seller's scenarios based on seller's particular products and seller's supply capacity at step 720. Based on these calculations, negotiation module 214 of supply manager 54 may determine at step 725 whether the contract terms proposed by buyer computer 20 are acceptable.

In addition, or in the alternative, negotiation module 214 may consult negotiation information file 234 to determine whether the proposed contract terms are acceptable. If the proposed contract terms are found to be acceptable at step 725, execution module 219 executes the option contract at step 740. If, however, negotiation module 214 determines at step 725 that the proposed contract terms are not acceptable, negotiation module 214 may communicate alternate proposed contract terms to buyer computer 20 at step 730 and negotiate the ultimate terms of the contract at step 735. The negotiating step 735 may include comparing proposed contract terms to a range of acceptable terms stored in negotiation file 234, and identifying particular terms as requiring user input prior to acceptance.

Execution module 219 stores the terms of the executed contract in memory 52 at step 745. This example, like the one described with respect to FIG. 5, addresses the execution of an incrementally exercised option contract 500 (see FIG. 4). Upon receiving a request from buyer computer 20 to exercise an option in the contract at step 750, supply manager 54 accesses memory 52 to determine the terms of the option contract at step 755. Supply manager 54 determines at step 760 whether exercise period 534 has begun. If supply manager 54 determines at step 760 that exercise period 534 has not begun, supply manager 54 notifies buyer computer 20 at step 765 that its request is improper, in this case because it is premature. Of course, supply manager 54 may be programmed to accept premature purchase orders.

If supply manager 54 determines at step 760 that exercise period 534 has begun, it determines at step 770 whether the request exceeds the maximum seller obligation. In this case, the option 530 in contract 500 is a quantity option specifying a lower quantity limit 526 and an upper quantity limit 528. Lower quantity limit 526 specifies the minimum obligation of the buyer in purchasing the specified product, and upper quantity limit 528 specifies the maximum obligation of the seller in supplying that product. If supply manager 54 determines at 770 that the exercise request from buyer computer 20 exceeds the maximum seller obligation, in this case upper quantity limit 528, supply manager 54 notifies buyer computer 20 that its request is improper at step 765. Of course, supply manager 54 could be programmed to accept exercise requests that exceed the maximum seller obligation, for example, those exceeding the maximum seller obligation by a predetermined amount.

If supply manager 54 determines at step 770 that the exercise request received from buyer computer 20 does not exceed the maximum seller obligation, it stores the exercise request at step 775 in contract information file 232 of memory 52. Supply manager 54 determines at step 780 whether the exercise period 534 has ended. For example, supply manager 54 may compare a current date (obtained, for example, from the system clock of seller computer 40) with exercise period end date 538. If supply manager 54 determines at step 780 that the exercise period 534 has not ended, it may receive another exercise request at step 785 from buyer computer 20 and process that request as described above.

If supply manager 54 determines at step 780 that exercise period 534 has ended, it determines at step 790 whether the minimum obligation 526 of the buyer has been met. In this case, the minimum buyer obligation 526 is a requirement that the buyer purchased a minimum quantity of product. If supply manager 54 determines at step 790 that the buyer's minimum obligation has not been met, it determines a penalty at step 795 for the buyer's short fall. In this example, contract 500 contains a penalty provision 524 specifying a penalty of one dollar per unit of quantity violation. Tracking module 220 accesses contract information file 232 to identify this contract provision, compare it to the quantity exercised by buyer computer 20, and calculate a resulting penalty.

Supply manager 54 facilitates satisfaction of the seller's obligation at step 800. For example, supply manager 54 may be programmed to automatically schedule delivery of the exercised quantity of product if that exercised quantity is at least equal to the lower quantity limit 526 and not more than the upper quantity limit 528. Of course, supply manager 54 may also be programmed to accommodate deliver of nonconforming quantity requests.

While the exemplary embodiments of the present invention have been shown and described, it will be understood that various changes and modifications to the foregoing embodiments may become apparent to those skilled in the art without departing from the spirit and scope of the present invention. Accordingly, the invention is not limited to the embodiments disclosed, but rather by the appended claims and their equivalents.

What is claimed is:

1. A method of optimizing multi-enterprise supply chain agreements using an electronic scenario based option contract, the method comprising:
    creating at a buyer computer a plurality of scenarios of forecasted demand for one or more products;
    communicating from the buyer computer to a seller computer an offer to enter into an option contract for the supply of the one or more products, the option contract including an option corresponding to each of the plurality of scenarios of forecasted demand;
    executing the option contract;
    receiving at the buyer computer an indication of current buyer demand for at least one scenario associated with the one or more products;
    automatically and without user input subsequent to receiving at the buyer computer the indication of current buyer demand for the one or more products, determining at the buyer computer whether the indicated current buyer demand exceeds the forecasted demand specified in the option contract; and
    automatically and without user input subsequent to determining at the buyer computer whether the indicated current buyer demand exceeds the forecasted demand specified in the option contract, if the indicated current buyer demand does not exceed the forecasted demand specified in the option contract, communicating from the buyer computer to the seller computer a request to exercise at least a portion of the option based at least in part on the indicated current buyer demand.

2. The method of claim 1, further comprising, at the buyer computer:
    monitoring an exercised portion of the option;
    comparing the exercised portion of the option with the forecasted demand specified in the option contract to determine whether a buyer obligation under the option contract has been met;
    determining whether an option period specified in the option contract has ended; and
    if the buyer obligation has not been met and the option period has ended, determining an applicable buyer penalty based at least in part on a penalty specified in the option contract.

3. The method of claim 1, wherein the plurality of scenarios of forecasted demand for one or more products comprises at least one alternate scenario of forecasted demand.

4. The method of claim 1, wherein at least one scenario of the plurality of scenarios of forecasted demand for one or more products comprises option parameters selected from a group consisting of:
- a specified quantity of the one or more products that a buyer associated with the buyer computer is obligated to purchase, and a specified quantity of the one or more products that the seller is obligated to supply;
- a specified number of product types that the buyer is obligated to purchase, and a specified number of product types that a seller associated with the seller computer is obligated to supply; and
- a specified number of locations where the one or more products must be delivered.

5. The method of claim 1, wherein the option contract includes an exercise period comprising a period of time after the execution of the option contract during which a buyer associated with the buyer computer must exercise its option for at least one scenario of the plurality of scenarios.

6. The method of claim 5, wherein exercising the option for at least one scenario of the plurality of scenarios comprises:
- specifying a first quantity of product desired at a first time during the exercise period;
- specifying a second quantity of product desired at a second time during the exercise period;
- and wherein updating forecasted demand comprises the sum of the first and second quantities of product desired.

7. The method of claim 1, further comprising:
- receiving from the seller computer a modified plurality of scenarios of forecasted demand comprising at least one scenario of the plurality of scenarios of forecasted demand modified by an optimization model at the seller computer; and
- accepting the modified plurality of scenarios of forecasted demand as a term to the option contract.

8. The method of claim 1, further comprising:
- receiving a proposed contract term, for at least one scenario of the plurality of scenarios, from the seller computer;
- accessing a memory comprising a range of acceptable contract terms for each of the plurality of scenarios; and
- comparing the proposed contract term to the range of acceptable contract terms.

9. The method of claim 8, further comprising:
- determining that the proposed contract term is within the range of acceptable contract terms; and
- accepting the proposed contract term, for at least one scenario of the plurality of scenarios, without user input.

10. The method of claim 8, further comprising:
- determining that the proposed contract term is not within the range of acceptable contract terms; and
- identifying the proposed contract term as a term requiring user input prior to acceptance.

11. The method of claim 1, further comprising:
- determining at the buyer computer a proposed option price, for at least one scenario of the plurality of scenarios, comprising a value of the option to a buyer associated with the buyer computer;
- communicating from the buyer computer to the seller computer the proposed option price; and
- negotiating with the seller computer an agreed option price based on the value of the option to the buyer and a cost of the option to a seller associated with the seller's computer.

12. The method of claim 11, wherein negotiating an agreed option price comprises:
- receiving from the seller computer a modified proposed plurality of scenarios of forecasted demand comprising at least one proposed scenario of the plurality of scenarios of forecasted demand modified by an optimization model at the seller computer;
- determining a modified proposed option price, for at least one scenario of the plurality of scenarios, based on at least one modified proposed scenario of the plurality of scenarios of forecasted demand; and
- communicating the modified proposed option price to the seller computer.

13. A method of optimizing multi-enterprise supply chain agreements using an electronic scenario based option contract, the method comprising:
- receiving at a seller computer terms of an option contract from a buyer computer, the terms comprising an option corresponding to a buyer's plurality of scenarios of forecasted demand for one or more products;
- communicating to the buyer computer an acceptance of the terms of the option contract for at least one scenario of the plurality of scenarios;
- storing the terms of the accepted option contract in a memory accessible to the seller computer; and
- receiving, at the seller computer and from the buyer computer, a request to exercise at least a portion of the option, for at least one scenario of the plurality of scenarios, based at least in part on an indication of current buyer demand for the at least one scenario associated with the one or more products.

14. The method of claim 13, further comprising:
- at the seller computer, automatically and without user input subsequent to receiving at the seller computer the request to exercise at least the portion of the option, for the at least one scenario of the plurality of scenarios, in response to receiving the request:
  - accessing the stored terms of the option contract, for the at least one scenario of the plurality of scenarios; and
  - using the stored terms of the option contract:
    - determining whether an option period, for the at least one scenario of the plurality of scenarios, specified in the option contract has begun;
    - if the option period, for the at least one scenario of the plurality of scenarios, has not yet begun, notifying the buyer computer that the request is premature; and
    - if the option period, for the at least one scenario of the plurality of scenarios, has begun:
      - determining whether the request specifies a request quantity that exceeds a maximum option quantity specified in the option contract;
      - if the request quantity exceeds the maximum option quantity, for the at least one scenario of the plurality of scenarios, notifying the buyer computer that the request is improper; and
      - if the request quantity does not exceed the maximum option quantity, for the at least one scenario of the plurality of scenarios, storing the request for seller compliance.

15. The method of claim 13, wherein the plurality of scenarios of forecasted demand for one or more products comprises at least one alternate scenario of forecasted demand.

16. The method of claim 13, wherein at least one scenario of the plurality of scenarios of forecasted demand for one or more products comprises option parameters selected from a group consisting of:

a specified quantity of the one or more products that a buyer associated with the buyer computer is obligated to purchase, and a specified quantity of the one or more products that a seller associated with the seller computer is obligated to supply;

a specified number of product types that the buyer is obligated to purchase, and a specified number of product types that the seller is obligated to supply; and a specified number of locations where the one or more products must be delivered.

17. The method of claim 13, wherein the option contract includes an exercise period comprising a period of time after the execution of the option contract during which a buyer associated with the buyer computer must exercise its option for at least one scenario of the plurality of scenarios, and wherein enforcing the terms of the option contract comprises:

receiving a request from the buyer computer to exercise the buyer's option for the at least one scenario of the plurality of scenarios comprising an identification of the buyer's exercised level of demand under the contract;

accessing the memory to retrieve the stored contract terms, including an exercise period begin date and an exercise period end date; and comparing a current date to the exercise period begin date and the exercise period end date.

18. The method of claim 17, further comprising:
determining that the exercise period has begun and has not expired; and
accepting the buyer computer's request to exercise the buyer's option for the at least one of the plurality of scenarios.

19. The method of claim 18, wherein the buyer computer's request comprises an identification of a first quantity of product desired, and further comprising:

storing the request for a first quantity of product desired in the memory;

receiving a subsequent request from the buyer computer to exercise the buyer's option for the at least one scenario of the plurality of scenarios comprising an identification of a second quantity of product desired;

determining that the exercise period has not yet expired; and storing the request for the second quantity of product desired in the memory.

20. The method of claim 18, further comprising:
comparing the buyer's exercised demand level to a minimum obligation of the buyer under the contract; and
determining a penalty if the buyer's minimum obligation level exceeds the buyer's exercised demand level after the expiration of the exercise period.

21. A system of procurement management, comprising:
a buyer computer comprising one or more processing units and one or more memory units, the buyer computer comprising:
a forecast module configured to create a plurality of scenarios of forecasted demand for one or more products;
a negotiation module configured to communicate to a seller computer an offer to enter into an option contract for the supply of the one or more products, the option contract including a proposed option corresponding to each of the plurality of scenarios of forecasted demand, the negotiation module further configured to receive from the seller computer a modified plurality of scenarios of forecasted demand, to communicate the modified plurality of scenarios of forecasted demand to the forecast module, and to receive from the forecast module a compromised plurality of scenarios of forecasted demand;

a scenario analyzer module configured to create multiple scenarios of demand including alternate scenarios of demand based on the forecasted demand;

an execution module configured to execute an option contract including an option corresponding to the compromised plurality of scenarios of forecasted demand;

an exercise module configured to:
receive from the forecast module an indication of current buyer demand for the one or more products;
determine whether the indicated current buyer demand exceeds a maximum option quantity specified in the option contract; and
if the indicated current buyer demand does not exceed the maximum option quantity specified in the option contract, communicate to the seller computer a request to exercise at least a portion of the option based at least in part on the indicated current buyer demand.

22. The system of claim 21, wherein at least one scenario of the plurality of scenarios of forecasted demand for one or more products comprises option parameters selected from a group consisting of:

a specified quantity of the one or more products that a buyer associated with the buyer computer is obligated to purchase, and a specified quantity of the one or more products that a seller associated with the seller computer is obligated to supply;

a specified number of product types that the buyer is obligated to purchase, and a specified number of product types that the seller is obligated to supply; and a specified number of locations where the one or more products must be delivered.

23. The system of claim 21, wherein at least one scenario of the plurality of scenarios of forecasted demand for one or more products comprises option parameters selected from a group consisting of:

a specified quantity of the one or more products that a buyer associated with the buyer computer is obligated to purchase, and a specified quantity of the one or more products that a seller associated with the seller computer is obligated to supply;

a specified number of product types that the buyer is obligated to purchase, and a specified number of product types that the seller is obligated to supply; and a specified number of locations where the one or more products must be delivered.

24. The system of claim 21, wherein the option contract includes an exercise period comprising a period of time after the execution of the option contract during which a buyer associated with the buyer computer must exercise its option for at least one scenario of the plurality of scenarios, and wherein the exercise module is further configured to specify a first quantity of product desired at a first time during the exercise period and to specify a second quantity of product desired at a second time during the exercise period, the buyer's obligation under the option contract comprising the sum of the first and second quantities of product desired.

25. The system of claim 21, wherein the negotiating module is further configured to receive a proposed contract term, for at least one scenario of the plurality of scenarios, from the seller computer, access a memory comprising a range of acceptable contract terms for each of the plurality of scenarios, determine that the proposed contract term is within the range of acceptable contract terms, and to accept the proposed contract term, for at least one scenario of the plurality of scenarios, without user input.

26. The system of claim 21, wherein the negotiating module is further configured to receive a proposed contract term from the seller computer, access a memory comprising a range of acceptable contract terms for each of the plurality of scenarios, determine that the proposed contract term is not within the range of acceptable contract terms, and to identify the proposed contract term, for at least one scenario of the plurality of scenarios, as a term requiring user input prior to acceptance.

27. The system of claim 21, wherein the buyer computer further comprises an aggregation module configured to compare a buyer's aggregation of parameters with a seller's aggregation of parameters, and to transform at least one scenario of the aggregations of parameters to conform with a common aggregation of parameters.

28. The system of claim 21, wherein the buyer computer further comprises an option price module configured to determine a proposed option price, for at least one scenario of the plurality of scenarios, comprising a value of the option to a buyer associated with the buyer computer and to communicate the proposed option price to a seller computer, and wherein the negotiation module is configured to negotiate with the seller computer an agreed option price based on the value of the option to the buyer and a cost of the option to a seller associated with the seller's computer.

29. The system of claim 21, wherein the buyer computer further comprises a tracking module configured to store terms of the executed option contract and to track the buyer's fulfillment of its obligations under the option contract.

30. The system of claim 21, wherein the buyer computer further comprises a tracking module configured to:
monitor an exercised portion of the option;
compare the exercised portion of the option with a minimum option quantity specified in the option contract to determine whether a buyer obligation under the option contract has been met;
determine whether an option period specified in the option contract has ended; and
if the buyer obligation has not been met and the option period has ended, determine an applicable buyer penalty based at least in part on a penalty specified in the option contract.

31. A system of supply management, comprising:
a seller computer comprising one or more processing units and one or more memory units, the seller computer comprising:
a forecast module configured to determine a seller's forecasted supply capacity for one or more products;
a negotiation module configured to receive from a buyer computer an offer to enter into an option contract for a plurality of scenarios of buyer's forecasted supply needs of one or more products, the option contract including a proposed option corresponding to the seller's forecasted supply capacity for the one or more products;
a scenario analyzer module configured to translate at least one scenario of the plurality of scenarios of supply needs into seller's scenarios based on seller's supply capacity;
an execution module configured to execute the option contract for at least one scenario of the plurality of scenarios and to store the terms of the option contract in a memory accessible to the seller computer; and a tracking module configured to receive, from the buyer computer, a request to exercise at least a portion of the option, for at the least one scenario of the plurality of scenarios.

32. The system of claim 31, wherein the seller computer further comprises:
in response to receiving the request:
access the stored terms of the option contract, for the at least one scenario of the plurality of scenarios; and
using the stored terms of the option contract:
determine whether an option period, for the at least one scenario of the plurality of scenarios specified in the option contract has begun;
if the option period, for the at least one scenario of the plurality of scenarios has not yet begun, notify the buyer computer that the request is premature; and
if the option period, for the at least one scenario of the plurality of scenarios has begun:
determine whether the request specifies a request quantity that exceeds a maximum option quantity specified in the option contract;
if the request quantity exceeds the maximum option quantity, for the at least one scenario of the plurality of scenarios, notify the buyer computer that the request is improper; and
if the request quantity does not exceed the maximum option quantity, for at least one scenario of the plurality of scenarios, storing the request system for seller compliance.

33. The system of claim 31, wherein the plurality of scenarios of buyer's forecasted supply needs for one or more products comprises at least one alternate scenario of buyer's forecasted supply needs.

34. The system of claim 31, wherein at least one scenario of the plurality of scenarios of buyer's forecasted supply needs for one or more products comprises option parameters selected from a group consisting of:
a specified quantity of the one or more products that a buyer associated with the buyer computer is obligated to purchase, and a specified quantity of the one or more products that the seller is obligated to supply;
a specified number of product types that the buyer is obligated to purchase, and a specified number of product types that the seller is obligated to supply; and
a specified number of locations where the one or more products must be delivered.

35. The system of claim 31, wherein the option contract includes an exercise period during which the buyer must exercise its option for at least one scenario of the plurality of scenarios, and wherein the option contract comprises a maximum supply quantity that the seller has agreed to supply, and wherein the request to exercise the option for the at least one scenario of the plurality of scenarios comprises a first request for a first quantity of product desired, and wherein the tracking module is configured to store the request in the memory if a current date is within the exercise period and the first quantity is less than or equal to the specified supply quantity.

36. The system of claim 31, wherein the option contract comprises a penalty term specifying a penalty for a violation of the contract terms, and wherein a tracking module is configured to identify a violation of the contract terms and to assess a penalty for the violation based on the penalty term.

37. The system of claim 31, wherein the offer to enter into the option contract comprises a proposed term, and wherein the negotiation module is configured to access a memory comprising a range of acceptable contract terms for each of the plurality of scenarios, determine that the proposed contract term is within the range of acceptable contract terms, and to accept the proposed contract term, for at least one scenario of the plurality of scenarios without user input.

38. The system of claim 31, wherein the offer to enter into the option contract comprises a proposed term, and wherein the negotiation module is configured to access a memory comprising a range of acceptable contract terms for each of the plurality of scenarios, determine that the proposed contract term is not within the range of acceptable contract terms, and to identify the proposed contract term, for each of the plurality of scenarios, as a term requiring user input prior to acceptance.

39. The system of claim 31, further comprising an aggregation module configured to compare a buyer's aggregation of parameters with a seller's aggregation of parameters, and to transform at least one scenario of the aggregations of parameters to conform with a common aggregation of parameters.

40. The system of claim 31, wherein the seller computer further comprises an option price module configured to determine a proposed option price, for each of the plurality of scenarios, comprising a cost of the proposed option to a seller associated with the seller computer and to communicate the proposed option price to the buyer computer, and wherein the negotiation module is configured to negotiate with the seller computer an agreed option price based on the value of the option to the buyer and a cost of the option to a seller associated with the seller's computer.

* * * * *